(12) United States Patent
Goel et al.

(10) Patent No.: US 11,431,577 B1
(45) Date of Patent: Aug. 30, 2022

(54) SYSTEMS AND METHODS FOR AVOIDING DUPLICATE ENDPOINT DISTRIBUTION

(71) Applicant: Amazon Technologies, Inc., Seattle, WA (US)

(72) Inventors: Nalin Goel, Seattle, WA (US); Jason Messer, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/146,317

(22) Filed: Jan. 11, 2021

(51) Int. Cl.
*H04L 41/12* (2022.01)
*H04L 45/7453* (2022.01)
*H04L 45/16* (2022.01)
*H04L 41/0893* (2022.01)

(52) U.S. Cl.
CPC .......... *H04L 41/12* (2013.01); *H04L 41/0893* (2013.01); *H04L 45/16* (2013.01); *H04L 45/7453* (2013.01)

(58) Field of Classification Search
None
See application file for complete search history.

(56) References Cited

U.S. PATENT DOCUMENTS

| 2015/0180971 | A1* | 6/2015 | Varney | H04L 67/2842 709/204 |
| 2017/0289216 | A1* | 10/2017 | N | H04L 45/22 |
| 2021/0099532 | A1* | 4/2021 | Goel | H04L 67/1002 |

* cited by examiner

*Primary Examiner* — Kevin T Bates
*Assistant Examiner* — Emad Siddiqi
(74) *Attorney, Agent, or Firm* — Knobbe, Martens, Olson & Bear, LLP

(57) ABSTRACT

A system and method for endpoint selection in a global accelerator system. The global accelerator system includes client devices communicating with a global access point to access various endpoints that can host services. The access points may calculate ranked lists of the plurality of endpoints based on a selection algorithm for the access points and select, for each access point, one of the plurality of endpoints based on the ranked lists before routing the received packets to the selected endpoints by each respective access point.

21 Claims, 7 Drawing Sheets

SYSTEMS AND METHODS FOR AVOIDING DUPLICATE ENDPOINT DISTRIBUTION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

When access points are used to provide services from endpoints at data centers to requesting clients in a communication environment, multiple paths may be established between each client and the service. However, in some instances, specifics of requests transmitted by the client may result in the service endpoint not correctly establishing communications in response to each request. This lack of established communications may result in errors and other issues in the communication environment.

DETAILED DESCRIPTION

Figure 1:
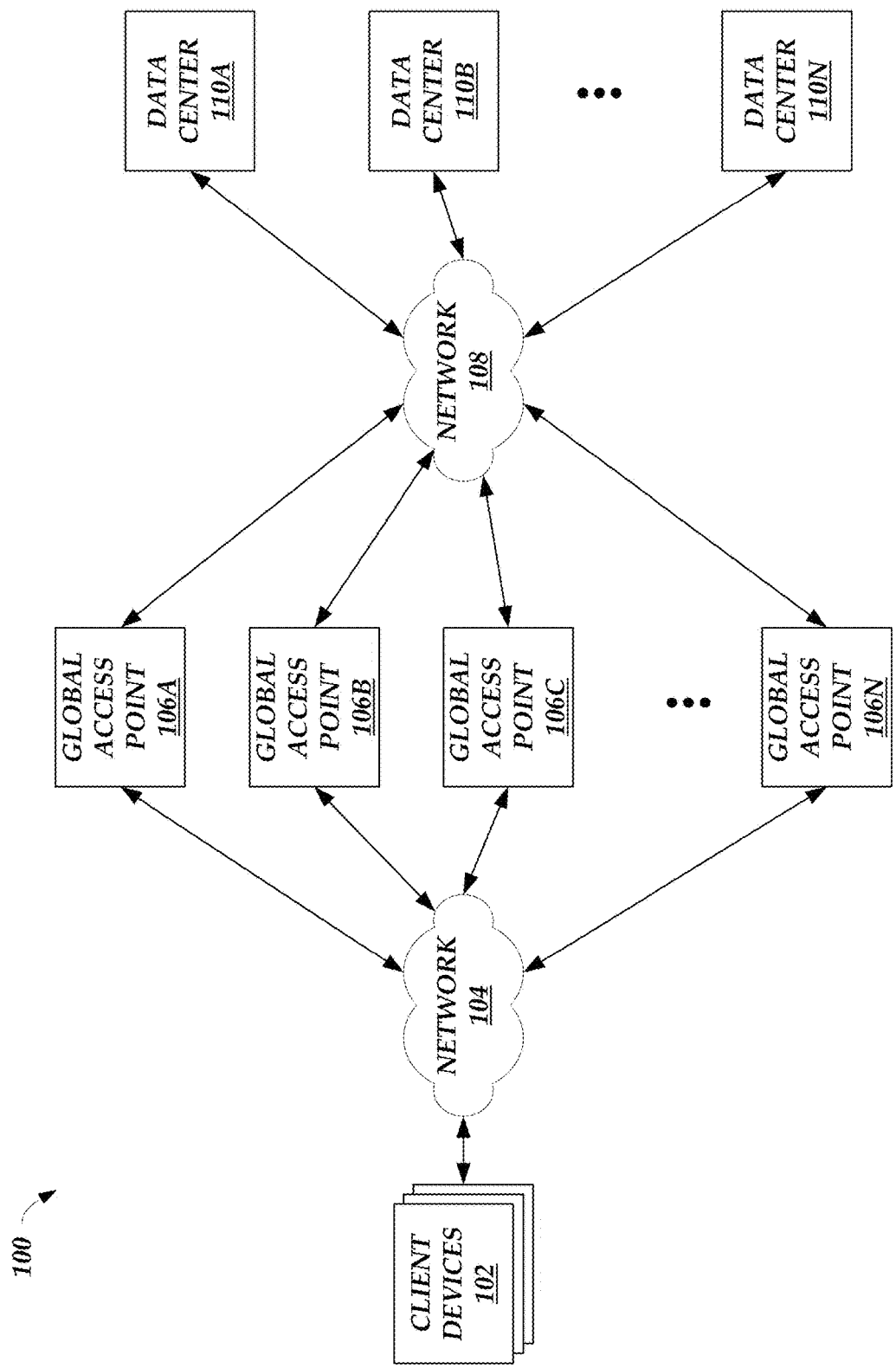
FIG. 1 is a block diagram depicting an illustrative logical network including multiple client devices and data centers, as well as a set of global access points providing load-balanced access to the data centers from a set of global network addresses.

Generally described, aspects of the present disclosure relate to providing access to a pool of computing devices spread across one or more geographic locations, using one or more network addresses. More specifically, aspects of the present disclosure relate to providing a distributed set of access or routing points reachable via the network addresses (i.e., global access points or any other network routing devices), which select and route requests to endpoint devices within the pool of devices. In some embodiments, the requests can be routed based at least partly on load balancing the requests. In one embodiment, the access points utilize routing techniques (for example, anycast or similar routing techniques) to advertise availability of global network addresses associated with the pool of computing devices, thereby attracting traffic addressed to those addresses.

On receiving a request to access the pool, an access point may select an appropriate endpoint within the pool based on a selection and/or distribution algorithm that facilitates a distribution of packets to different groupings of one or more endpoints, generally referred to as endpoint groups. Thus, the access point may then act as a proxy, routing the request to the appropriate endpoint or endpoint group and facilitating further communications between the endpoint and a requesting device. The access points may provide resilient, efficient access to the pool of endpoint devices by enabling a single requesting device to generate multiple paths between the requesting device and the target endpoints and corresponding service. The access points may also be distributed among a wide geographic area, thus eliminating single points of failure within the system.

Embodiments of the present disclosure may illustratively be implemented in a wide geographic area. In one embodiment, the present disclosure is implemented on the world-wide Internet, and provides global internet protocol (IP) addresses, such as IP version 4 (IPv4) or IP version 6 (IPv6) addresses. Different data centers may exist in different geographic locations, and each data center may include one or more endpoint devices providing access to a network-based service. Examples of such services include, but are not limited to, web hosting, data storage, on-demand compute services, and the like. The resources at each data center may be limited, and thus an operator of the network-based service may wish to distribute load among such services.

To provide global network addresses for a service, a system is disclosed that provides a set of geographically distributed global access points. Such network addresses are generally referred to herein as "global" network addresses. As used herein, the term "global" is intended to refer to the scope of the network address with relation to the service (e.g., that the network address applies to the entire service, rather than individual devices), and does not necessarily imply that such a network address is accessible worldwide. Nevertheless, embodiments of the present disclosure may be implemented to provide global network addresses that are generally accessible from a worldwide network, such as the Internet. Generally, however, the access points are geographically distributed. In one embodiment, the access points are located in geographic locations different and more numerous than those of the data centers providing endpoints for the service, decreasing the average network distance between the access points and client devices attempting to access the service.

Each access point may utilize techniques (for example, anycast techniques) to advertise the availability of the service via the one or more global network addresses associated with the service. Illustratively, each access point may utilize Border Gateway Protocol ("BGP") to advertise the global network addresses, by including a BGP "speaker" to announce availability of the global network address to neighboring networks. The global access point may thus attract traffic address to the global network addresses. As disclosed in more detail below, the global access points may in some instances "shape" BGP announcements to increase resiliency of a network-based service to network interruptions. For example, the global access points may divide their announced global network addresses into two groups, and assign a service at least one network address from each group. The global access points may then announce each group of addresses to a different neighboring network. In this manner, each access point can effectively create two paths to reach the point: through a first neighbor using an address of the first group, or through a second neighbor using an address of a second group. Thus, if one neighboring network fails in some way, an alternative path to reach the access point exists. Moreover, because each access point may operate in this manner, if one access point fails entirely, traffic may be automatically routed to another access point via traditional anycast routing mechanisms. While examples are provided herein related to two groups, any number of groups may be provided.

After receiving a request to access a service, a global access point can be configured to route the traffic to an appropriate endpoint, for example within a data center providing the service. To do so, the global access point may be required to be aware of a network address of the endpoint. Thus, on receiving a request to access a service, each access point may be configured to select an available endpoint for the service and to route the request to that endpoint. The global access point can apply a selection algorithm to select individual endpoints based on processing attributes of the request (e.g., 5 tuple information) to ensure that a selected endpoint is consistently selected. For example, the global access point can implement a scoring algorithm that facilitates consistent selection of an endpoint based on a highest score generated based on the 5 tuple information.

In one embodiment, to route traffic to an endpoint, each access point is configured to utilize network address translation ("NAT"). NAT techniques are known within the art, and thus will not be described in detail herein. However, in general, NAT techniques enable a device to act as a middleman between two devices, while rewriting aspects of each data packet, such as a source and/or destination network address, to facilitate communications between the devices. In accordance with embodiments of the present disclosure, each access point (and other "middle man" components, such as gateways) may operate to replace a source network address of a requesting device with its own network address (e.g., a unicast network address uniquely identifying the global access point), and to replace the destination network address (e.g., the global network address of a service) with a network address of an endpoint providing that service. The access point may then route the packet to the endpoint, receive a response from the endpoint (if any), perform a reverse translation of source and destination (e.g., replacing the source of the response with the global network address and the destination of the response with the network address of the requesting device), and return the packet to the requesting device. In one embodiment, the access point may utilize port translation (known in the art) to facilitate distinction of traffic flows (series of interrelated packets) when utilizing NAT, to ensure correct translation of addresses when handling traffic from multiple requesting devices.

In another embodiment, to route traffic to an endpoint, each access point is configured to utilize encapsulation. Encapsulation is a known networking technique, and thus will not be described in detail herein. However, in general encapsulation can be utilized to add additional information (frequently in the form of a header, and sometimes also in the form of a trailer) to a data packet, thus "wrapping" or encapsulating the data packet to result in an encapsulated data packet. In the context of the present disclosure, encapsulation may be utilized to provide a "network tunnel" between each access point and endpoint.

In one embodiment, the endpoint may respond directly to the client device, via a physical network connecting the endpoint to the client device. In another embodiment, the endpoint may respond to the client device by encapsulating a response packet, and transmitting the encapsulated response packet back to the access point. The access point may in turn decapsulate the response packet and return the response packet to the client. Direct return of responses from an endpoint to a client device may beneficially reduce workload of an access point, and may also reduce traffic on a physical network connecting the access point to the endpoint.

Illustratively, a customer's service may have multiple communication paths (via the access points) between a client's device (having an assigned source IP address and port) and the service endpoint (having an assigned destination IP address and port) being requested or utilized via the networked connection, for example, the Internet. For example, the multiple communication paths may utilize two global access points that each announce or utilize a unique IP address and/or port. For example, the first global access point may have a first IP address (for example, 1.2.3.4) and the second global access point may have a second IP address (for example, 2, 3.4.5). Both of the first and second IP addresses may be associated with a single DNS address, for example ABC.com. Thus, a request directed to ABC.com from the source port may be directed to each of or either 1.2.3.4 and 2.3.4.5.

The customer may configure the endpoint in a particular region, where the endpoint is, for example, an elastic compute cloud (EC2) and so forth. The first and second global access points may comprise edge locations for the endpoint. The client may access the endpoint for the customer via the Internet, for example through or via a gateway (such as a NAT gateway) or firewall and the global access point. The client device source IP address may be, for example 10.0.0.1.

When requesting access to the endpoint, the client device may generate two requests, one for each of the paths from the firewall or gateway to the endpoint via the two global access points. The duplicate requests may provide for redundancy. For example, the client device may generate the first request (for example, as a first packet) from IP address 10.0.0.1 port 234 for destination IP address 1.2.3.4 and generate the second request (for example, as a second packet) from the same IP address 10.0.0.1 but port 345 for destination IP address 2.3.4.5. The gateway may identify that the two requests have unique 5 tuples with the same source IP but different source port values and different destination IP and port values. The gateway may then provide each of the requests with the same source IP address and port values (for example, an IP address and port associated with the gateway) while maintaining the different destination port information. For example, each of the first and second requests may be updated to have a source IP of 3.4.5.6 and a source port of 345 while the destination information for each of the packets may have different information, for example different destination IP or port information. Due to the different destination IP or port information, the first and second requests may go to the first and second global access points, respectively, which may then direct both of the requests to the endpoint for the service. Thus, the pair of requests may form a diamond by their paths of communication from the gateway to the first and second global access points to the endpoint.

In some instances, the use of the duplicate source IP and port values for different communications can result in various issues, such as collisions between connections served by the same endpoint or problematic health checks for connections. For example, if the global access points forward both of the first and second requests to the same endpoint, then the endpoint may view the second received request as merely a duplicate of the first received request and may ignore the second request as opposed to completing any corresponding connection establishment. Such an embodiment where the first and second global access points take multiple requests from a single client source (i.e., the gateway) and forward them on to a single service endpoint create a diamond-shaped communication structure of the paths from the client (and gateway) to the endpoint. Such a communication structure may result in improper reset signals being communicated or maintenance of unhealthy connections and/or endpoints, among other concerns. Such issues and concerns may be increasingly prevalent when a large number of clients behind gateways establish connections with large numbers of endpoints through global access points. Similar issues as experienced with the diamond-shaped communication structure formed between the global access points and the endpoints described herein may also exist for any service that provides access to a client via a first network address (for example, a domain naming system (DNS) address) that links to multiple subsequent network addresses (for example, endpoint addresses).

To help reduce and/or minimize such issues, the global access points may utilize a selection and/or distribution algorithm to facilitate routing of communications (for example, the requests and corresponding responses) to endpoints. The algorithm may select individual endpoints to which individual global access points will direct or route traffic. This algorithm may also be used to ensure that the global access points do not send multiple requests from the same client device (for example, the first and second requests above) to the same endpoint of the service. More specifically, the algorithm may enable one of the global access points, for example, the first global access point, to identify to which endpoint the second global access point will route the second request and enable the first global access point to select a different endpoint from the second global access point to which to send the first request. The first and second global access points may use the algorithm to compute a score for each endpoint based on the 5 tuple of client IP address, client port, global IP address, global IP port, and protocol information for each request and an IP address for the endpoint. Since each global access point selects the endpoint having the highest score as its selected destination, because the first global access point can calculate, using the algorithm, the endpoint that the second global access point will select based on having the highest score for routing the second request, the first global access point can ensure that the first global access point selects a different endpoint (for example, the endpoint with the second highest score when the highest score is for the endpoint selected by the second global access point). Such a process for routing communications to endpoints may also apply to the service providing access for the client via the first network address that links to the multiple subsequent network addresses.

As will be appreciated by one of skill in the art in light of the present disclosure, the embodiments disclosed herein improves the ability of computing systems to provide network-accessible services. Specifically, embodiments of the present disclosure improve on prior load balancing techniques, by providing scalable, resilient, and responsive load-balancing across a common network address while reducing issues caused by duplicate communications. Moreover, the presently disclosed embodiments address technical problems inherent within computing systems; specifically, the limited nature of computing resources with which to provide network-accessible services and the difficulties of load-balancing requests to such services in a scalable, resilient, and responsive manner. These technical problems are addressed by the various technical solutions described herein, including the use of a distributed set of access points associated with a common network address, each configured to receive requests for a service, and to route the requests to specific endpoints of the service based at least partly on endpoints that corresponding requests are routed to. Thus, the present disclosure represents an improvement on existing network routing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram depicting an illustrative logical environment 100 including multiple client devices 102 in communication with a set of global access points 106a-n via a first network 104, which global access points 106a-n are in communication with a set of data centers 110a-n via a second network 108. While the client devices 102, global access points 106 and data centers 110 are within FIG. 1 in groups, the client devices 102, global access points 106 and data centers 110 may be geographically distant and/or independently owned or operated. For example, the client devices 102 could represent a multitude of users in various global, continental, or regional locations accessing network-accessible services provided by the data centers 110, which data centers may further be distributed among various global, continental, or regional locations. The global access points 106 may similarly be distributed. In one embodiment, the data centers 110 represent devices in locations under control of a single entity, such as a "cloud computing" provider, while the global access points 106 represent devices in co-tenanted locations, such as network "points of presence" or Internet Exchange Points (IXPs). The global access points 106 may generally be more numerous than the data centers 110 and in distinct physical locations. However, in other embodiments, one or more of the access points 106 may be located within one or more data centers 110. Accordingly, the groupings of client devices 102, access points 106, and data centers 110 within FIG. 1 is intended to represent a logical, rather than physical, grouping.

The networks 104 and 108 may be any wired networks, wireless networks or combination thereof. In addition, the networks 104 and 108 may be a personal area network, local area network, wide area network, cable network, satellite network, cellular telephone network, or combination thereof. In the example environment of FIG. 1, network 104 is a global area network (GAN), such as the Internet, while the network 108 is a private network dedicated to traffic associated with an entity providing the data centers 110 and access points 106. Protocols and components for communicating via the other aforementioned types of communication networks are well known to those skilled in the art of computer communications and thus, need not be described in more detail herein.

While each of the client devices 102 and access points 106 are depicted as having a single connection to the network 104, individual components of the client devices 102 and access points 106 may be connected to the network 104 at disparate points (e.g., through different neighboring networks within the network 104). In some embodiments, the data centers 110 may additionally or alternatively be connected to the network 104. Similarly, while each of the access points 106 and data centers 110 are depicted as having a single connection to the network 108, individual components of the access points 106 and data centers 110 may be connected to the network 108 at disparate points. Accordingly, communication times and capabilities may vary between the components of FIG. 1. The network configuration of FIG. 1 is intended to be illustrative of a communication path in embodiments of the present disclosure, and not necessarily to depict all possible communications paths.

Client devices 102 may include any number of different computing devices capable of communicating with the global access points 106. For example, individual client devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. In some instances, client devices 102 are operated by end users. In other instance, client devices 102 themselves provide network-accessible services, which interact with the global access points 106 to access other network-accessible services.

The data centers 110 of FIG. 1 illustratively include one or more endpoint computing devices providing one or more network-accessible services on behalf of one or more service providers. Illustratively, the data centers 110 may be operated by a "cloud computing" provider, which makes host computing devices within the data center available to service providers for providing their services. The cloud computing providing may generally manage operation of the data center, while providing various mechanisms for the server providers to configure their respective endpoints. One illustrative configuration of a data center 110 is provided below with respect to FIG. 2.

In accordance with embodiments of the present disclosure, the cloud computing provider may enable service providers to associate their endpoints with one or more global network addresses, which are addressable on the network 104 to interact with the data centers 110 in a load-balanced manner. The cloud computing provider may further enable the service providers to specify how such load-balancing should occur, such as by specifying a percentage of requests to be routed to each data center 110 or endpoint. The cloud computing provider may further enable the service providers to alter the configuration of endpoints independently of the global network addresses, such that altering the specific endpoints providing a service does not require reconfiguration of the network addresses. Use of global network addresses may significantly simplify operation of network services, since any client device 102 wishing to connect to the service may simply transmit a request to a global network address of the service. Alterations to the endpoints providing the service may then be made without the need to alter DNS records for the service, for example.

To facilitate global network addresses, a set of global access points 106a-n (also referred to herein as access points 106) are provided. Each access point may generally include one or more computing devices configured to obtain requests from client devices 102 to interact with services, and to route such requests to an endpoint within a data center 110 selected based at least partly on load-balancing requests across the data centers 110. Access points 106 may further act as a type of proxy for the endpoints, enabling traffic between client devices 102 and data centers 110 to flow across the access points 106. Operation of access points 106 is discussed in more detail below. However, in brief, they may utilize anycast techniques to broadcast availability of global network addresses to neighboring network devices within the network 104, which in one embodiment includes devices not under the control of a common entity as provides the access points 106a. The access points 106 may thus attract traffic addressed to the global network addresses. The access points 106 may thereafter select an endpoint to which to direct the traffic, based on factors such as availability of endpoints, load-balancing across data centers 110, and performance criteria between the access point 106 and the various data centers 110.

After selecting a data center 110, an access point 106 can route the request to one of the endpoints of the data center 110. In one embodiment, the access point 106 uses NAT translation or encapsulation (e.g., virtual private networks) to redirect the request to the endpoint over the network 108, preventing disclosure of a network address of the endpoint to the client devices 102. Where connection-oriented communication sessions are utilized between client devices 102 and an endpoint, the access point 106 may operate to conduct an initialization phase of the communication session on behalf of the endpoint, in accordance with the present embodiments. In instances where the network 108 is a private network, the global access points 106 may further function as an "offloading" point for traffic to the endpoints, moving that traffic from a public network (e.g., the network 104) to the private network 108. Generally, such a private network would be expected to have greater performance than a public network, and thus such offloading may further increase the speed of communication between client devices 102 and endpoints.

As noted above, the access points 106 may implement a variety of techniques to ensure resiliency of a network service using a global network address. Illustratively, the use of anycast to advertise access points 106 may provide resiliency between access points 106, as the failure of an individual access point 106 can generally be expected to cause devices of the network 104 to route requests to another access point 106. Moreover, to address potential failures of the network 104, each access point 106 can be configured to control its announcement of global network addresses on the network 104, providing multiple routing paths for each service to the access point 106. To address potential failures within an access point 106, each access point 106 may be configured to include multiple flow managers, handling different traffic flows addressed to global network addresses. The flow managers may be distributed logically, such as across program threads, and/or physically, such as across processors or computing devices.

Figure 2:
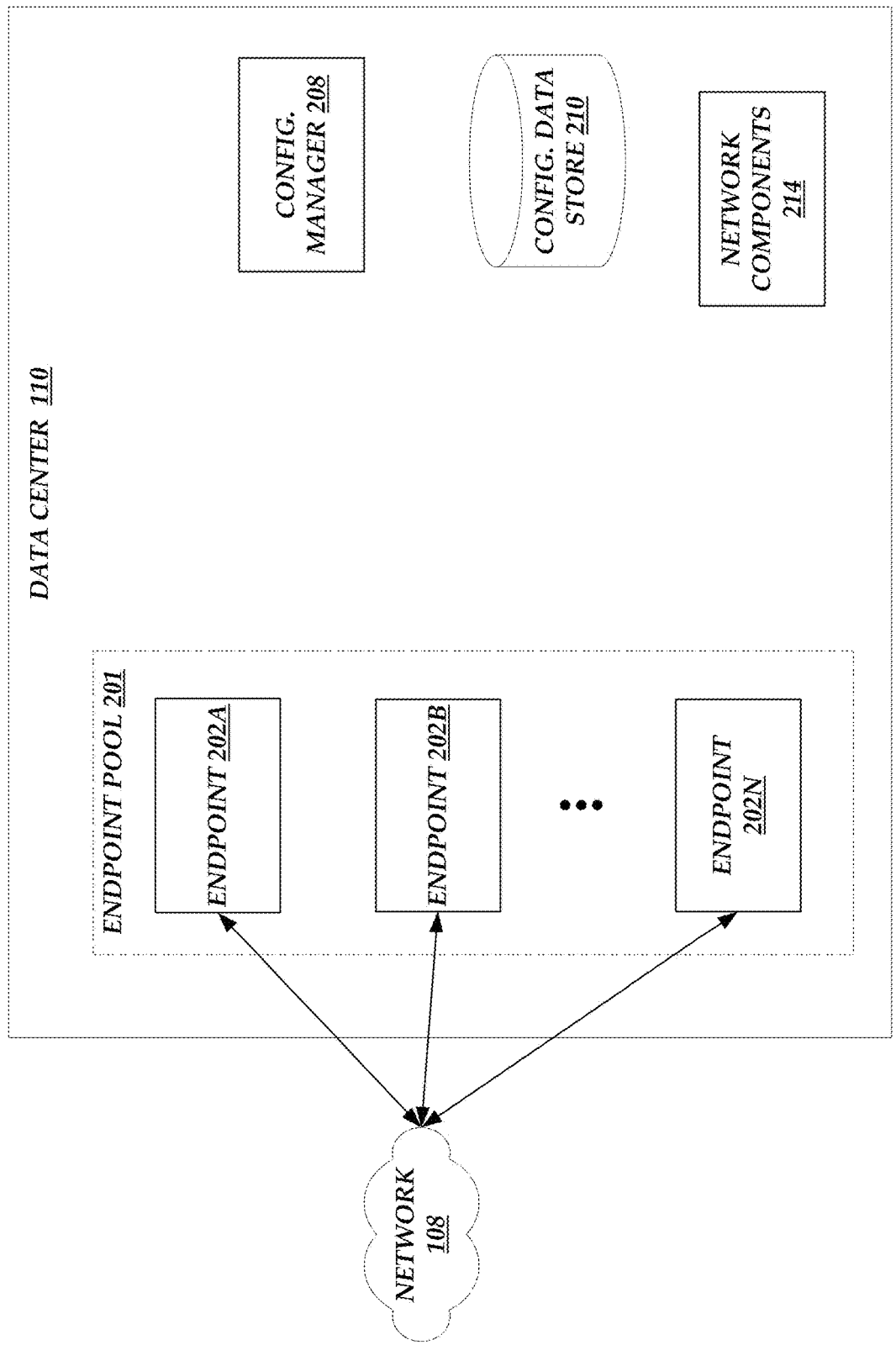
FIG. 2 is a block diagram depicting an illustrative configuration of a data center of FIG. 1.

FIG. 2 is a block diagram depicting an illustrative configuration of a data center 110 of FIG. 1. As shown in FIG. 2, the data center 110 includes an endpoint pool 201 containing a set of endpoints 202a-n. Each endpoint 202 illustratively represents a computing device configured to provide access to a network-accessible service. In one embodiment, endpoints 202 are individual physical computing devices. In another embodiment, endpoints 202 are virtualized computing devices executing on physical computing devices. In yet another embodiment, endpoints 202 are collections of computing devices (physical or virtualized) collectively configured to provide access to a network-accessible service. For example, each endpoint 202 may be a collection of devices being a load balancer device configured to load balance requests to the endpoint 202 among the collection of devices. Each endpoint 202 is in communication with the network 108, and thus addressable on the network 108. The number of endpoints 202 may vary, for example, depending on the capacity requirements of the network-accessible service. Illustratively, a service provider for such service may contract with an operator of the data center 110 (e.g., a cloud computing provider) to generate and provision the endpoints 202. In some embodiments, the data center 110 may comprise only one endpoint 202 and thus be replaced and referred to herein as the endpoint 202.

The data center 110 of FIG. 2 further includes a configuration manager 208, configured to enable service providers to configure operation of the data centers 110 and global access points 106. Illustratively, the configuration manager 208 may provide an interface through which users may specify endpoints 202 that provide a network-accessible service, configure those endpoints 202 and configure the resource manager 206 to scale up or down endpoints. The configuration manager 208 may further enable service providers to assign global network address to those endpoints, and to specify load-balancing parameters for routing traffic addressed to global network address to various data centers 110. The configurations created by service providers may be stored within a configuration data store 210, which can correspond to any persistent or substantially persistent storage device (e.g., hard disk drives, solid state drives, network-attached storage devices, etc.). In some instances, the configuration data store 210 may include multiple representations of a configuration of a service provider. For example, to facilitate rapid reconfiguration of global access points 106, the configuration data store 210 may include a database (such as a relational database) that is modified each time a service provider commits a change to their configuration. The configuration manager 208 may periodically (e.g., each 100 milliseconds, 1 second, 2 seconds, 5 seconds, 30 seconds, etc.) determine whether changes have been made to the database, and if so, generate a new configuration package for the global access points 106, which configuration package encompasses the changes to the database (and thus, service provider's configuration) relative to a prior configuration package. The configuration manager 208 may then store the configuration package into the configuration data store 210 for retrieval by the global access points 106. In one embodiment, each global access point 106 is configured to periodically (e.g., each 100 milliseconds, 1 second, 2 seconds, 5 seconds, 30 seconds, etc.) poll the configuration data store 210 to determine whether a new configuration package exists, and if so, to retrieve and implement the package. In some instances, a configuration package may be divided into package "parcels," representing a portion of the configuration. Global access points 106 may be configured to retrieve only those parcels modified with respect to an existing parcel. Modifications may be tracked, for example, based on versioning of parcels or a package. Still further, in some embodiments, packages or parcels may be stored in the data store 210 as differences or "deltas" from a prior version, such that an access point 106 may retrieve only changes since a prior version of the parcel, reducing the data transfer required to update a package or parcel. In one embodiment, the configuration manager 208 may periodically (e.g., each 100 milliseconds, 500 milliseconds, etc.) "checkpoint" packages or parcels, by collecting all changes since a prior checkpoint and storing the package or parcel as a standalone version. Such checkpointing may facilitate rapid reconfiguration in the instance that a global access point 106 has no frame of reference of a prior package or parcel.

Still further, the data center 110 can include various network routing components 214, such as top of rack ("TOR") switches that can be configured to route data packets to different endpoints 202. More specifically, in one embodiment, the TOR switches can utilize included in the data packets to route data packets to endpoints 202. For example, a TOR can utilize a 5-tuple information, namely, an IP address of the source, a port address of the source, an IP address of the destination, a port address of the destination, and a routing protocol to automatically route data packets to an assigned endpoint 202. This facilitates the utilization on a set of multiple VLANS or braids that secure transmissions to different endpoints 202. Still further, in other aspects of the present application the endpoints 202 can utilize Path MTU discovery messages to exchange information. According to aspects of the present application, to increase resiliency, in the event of a change in data packets, state information can be exchanged to facilitate continued processing of services/requests by the data center 110. More specifically, the endpoints can utilize multi-cast message transmission to a set of endpoints 202 that are associated with a particular VLAN or braid that allows only those endpoints to receive the multi-cast message, such as to pass along state information in the event an endpoint will be down and attempts to maintain continuity of service by providing state information to another endpoint. In other embodiments, the endpoints can utilize broadcast messages that are transmitted to all the endpoints in the data center 210. Because the broadcast message is received to all (or a larger portion) of endpoints, individual endpoints 202 in a data center may filter or exclude the messages that do not apply.

While only some components of the data center 110 are shown as in communication with the network 108, other components may additionally be in communication with the network 108 and/or the network 104. The lines of FIG. 2 are not intended to represent all actual or potential network connections, but rather to illustrate a possible flow of service-related traffic to endpoints 202.

Moreover, while shown within a data center 110, in one embodiment, global access points 106 may also include a configuration manager 208, enabling configuration of the access point 106 directly. In another embodiment, the global access points 106 exclude any configuration manager 208 and data store 210. For example, where access points 106 are implemented at co-tenanted environments (e.g., not operated by or accessible to parties other than an operator of the access points 106), the access points 106 may be configured to exclude any persistent storage, and to instead retrieve configuration information from a data center 110 on initialization of the access point 106. In this manner, security of the access points 106 may be increased, as powering down the access point 106 would be expected to result in loss of any sensitive data that may reside on the access point 106.

While the data center 110 is shown as including one endpoint pool 201, corresponding to one network-accessible service, the data center 110 may host numerous pools 201, each corresponding to a different service. Thus, multiple service providers may utilize a data center 110. Moreover, as noted above, each network-accessible service may be provided by endpoints 202 across multiple data centers 110. Accordingly, the global access points of FIG. 1 may distribute traffic to such a service across the data centers 110.

Figure 3:
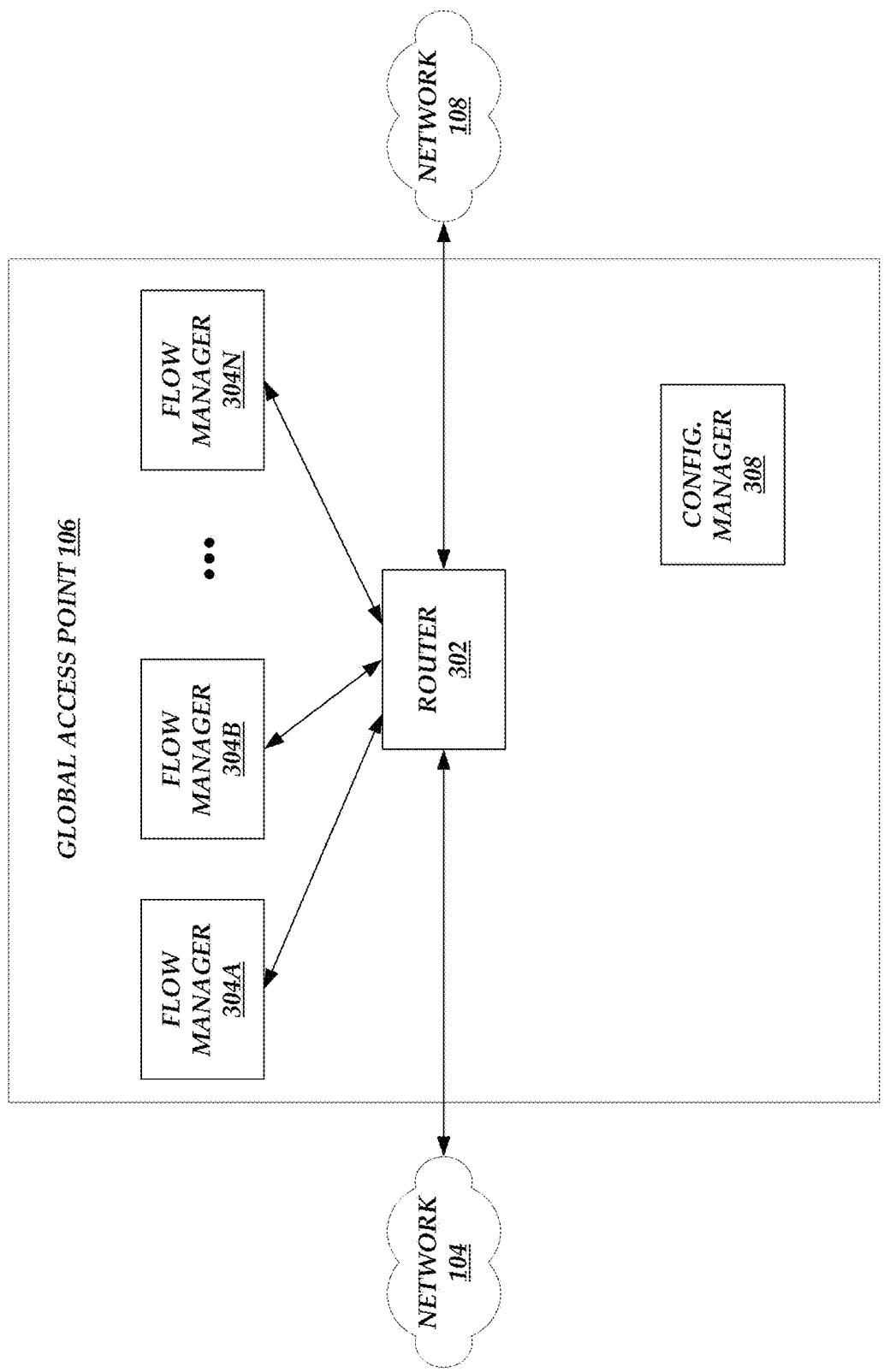
FIG. 3 is a block diagram depicting an illustrative configuration of a global access point of FIG. 1.

FIG. 3 is a block diagram depicting an illustrative configuration of a global access point of FIG. 1. As shown in in FIG. 3, each global access point 106 is in communication with the network 104 via a router 302. While only a single router 302 is shown in FIG. 2, access points 106 may include multiple routers 302. Moreover, while a single connection to the network 104 is shown, each router 302 may include multiple connections to the network 104, potentially to multiple different neighboring devices within the network 104, each of which may correspond to different sub-networks (e.g., autonomous systems (AS's) within the network 104).

As noted above, global access points 106 may be configured to utilize various techniques to attract traffic to global network addresses associated with network-accessible services. As such, the router 302 is illustratively configured to advertise the global network addresses to neighboring devices on the network 104. Such advertisements can cause the router 302 to attract traffic addressed to the global network addresses, as the advertisements can cause devices on the network 104 to route traffic addressed the addresses to the router 302, in accordance with operation of the techniques, for example, anycast techniques.

As discussed above, the global access point 106 may implement a variety of techniques to increase resiliency of the access point 106. In one embodiment, the global network addresses advertised by the access point 106 are divided into multiple address groups. To decrease the potential effects of failures on the network 104, the router 302 (or multiple routers 302) can be configured to transmit announcements for each address group to different neighboring devices on the network 104 (e.g., different AS's). A network-accessible service may be associated with addresses from multiple address groups, each of which may be provided to client devices 102 as an address at which to access the service. Because addresses from different groups are advertised differently on the network 104, different routing paths can be expected on the network 104 for addresses of each group. For example, packets addressed to addresses within a first group may reach the router 302 over a first AS of the network 104, while packets addressed to addresses within a second group may reach the router 302 over a second AS. Thus, if a failure were to occur within the first AS (or a downstream AS connected to the first AS), packets addressed to addresses within the second group may be expected to still reach the router 302, and vice versa. As such, dividing global network addresses into multiple groups can increase resiliency of the access points 106 to failures within the network 104.

On receiving a packet addressed to a global network address, the router 302 may route the packet to a flow manager 304 or other similar functioning component, from a set of flow managers 304a-n. While an access point 106 may implement a single flow manager 304, it may be beneficial for an access point to implement multiple flow managers 304 to provide redundant operation of such flow managers 304. The router 302 may use any number of known load-balancing techniques to distribute packets to the flow managers 304, such as round robin selection. In one embodiment, the router 302 utilizes consistent hashing to distribute packets. Consistent hashing is known in the art and will thus not be described in detail herein. Consistent hashing may be beneficial, for example, in increasing the changes that multiple packets with the same characteristics (e.g., source network address, source network port, destination network address, destination network port, protocol) are routed to the same flow manager 304. The flow manager 304 may comprise a processor or similar component to control and/or manage routing of requests and packets to the appropriate data center 110/endpoint 202.

On receiving a data packet, a flow manager 304 may determine a data center 110 and/or endpoint 202 to which to route the packet. In one embodiment, the flow manager 304 may apply a combination of criteria to select a data center 110 and/or endpoint 202 to which to route a packet, including network performance criteria, load-balancing criteria, and current or expected routing information. In a first aspect, a flow manager 304 may, for a given packet, initially select a data center 110/endpoint 202 based on network or geographic criteria between the global access point 106 and the various available data centers 110/endpoint 202 or groups of endpoints 202. The network or geographic criteria can correspond to a measure of network distance (e.g., across the network 108) from an identified access point 106. The network or geographic criteria can further include or incorporate, at least in part, performance criteria such as latency, number of hops, bandwidth, or a combination thereof. In general, routing of a packet to a data center 110 with a maximum network performance criteria may beneficially increase the speed of communication between a client device 102 and the data center 110. Because network performance criteria is unlikely to rapidly shift between an access point 106 and a data center 110, simply routing each packet to a data center 110 with a maximum expected performance criteria may not achieve the load balancing requested by a service provider.

In addition to measure or determined network or geographic criteria, each flow manager 304 may further modify incorporate distribution criteria, as necessary to achieve the desired load balancing of a service provider. More specifically, in some embodiments, each grouping of endpoints 202 (e.g., data centers 110) may be subdivided into different regions. Individual data centers 110 may associate subsets of endpoints 202 into different sub-regions or other groupings of a region. Accordingly, a customer may specify distribution criteria that identifies a measured distribution or method of calculating a measured distribution of data packets provided to a data center 110. Illustratively, the distribution may be specified as a percentage of traffic, total number of data packets (e.g., total amount of data, cost allocated or charged to individual endpoints, and the like. A system administrator may illustratively utilize a software tool or interface (e.g., an API) to provide allocations as will be described in various examples herein. In turn, the flow manager 304 can implement an algorithm, such as a coin-flip algorithm, to implement the percentage selections. The algorithm can consider additional factors such as geographic or network criteria as well.

In some embodiments, load balancing and/or other routing is implemented locally at each flow manager 304. In other embodiments, load balancing and/or routing is implemented across all flow managers 304 of an access point 106. In still other embodiments, load balancing and/or routing is implemented across flow managers 304 of multiple access points 106. In general, localized load balancing and/or routing is expected to be less resource intensive, as it requires less communication between distributed components. However, less localized load balancing and/or routing may result in load balancing criteria more closely resembling that desired by a service provider.

In some instances, flow managers 304 may implement a hybrid of localized and non-localized load balancing and/or other routing techniques. For example, each flow manager 304 may implement localized load balancing and/or (e.g., localized to each manager 304 or each access point 106), and periodically negotiate with other access points 106 to adjust the weights applied when selecting a data center 110. For example, as described below, where the access points 106 identify that multiple requests or packets are communicated from one client source through multiple access points 106, the access points 106 may communicate with each other or otherwise utilize routing techniques to ensure that duplicate requests or packets are not sent to the same endpoint 202. This may result in better optimized routing that reduces or eliminates errors, such as reset requests and/or maintenance of endpoints. In some scenarios, when load balancing, the access points 106 may communicate regarding their routing of traffic, and assuming for hypothetical sake that the volume of traffic at each point 106 is equal (and that only two access points 106 are considered), each access point 106 may begin to route all of their packets to a nearest data center 110. Such a division would still result in even division of traffic among the data centers 110, and moreover beneficially increase the average network performance metric for each flow of packets.

After selecting a data center 110 to which to route traffic, a flow manager 304 may select an endpoint 202 within the data center 110 to which to route the traffic when the data center 110 comprises multiple endpoints 202. The endpoint 202 may be selected according to any load balancing algorithm. In one embodiment, the flow manager 304 may utilize consistent hashing to select an endpoint 202.

In some embodiments, the flow manager 304 can implement a selection algorithm that attempts to consistently identify an endpoint 202. Illustratively, the selection algorithm can generate a score associated with various endpoints 202 applied against attributes of the individual endpoints or communications. For example, the selection algorithm can be calculated against the 5-tuple (e.g., namely, an IP address of the source, a port address of the source, an IP address of the destination, a port address of the destination, and a routing protocol) to automatically route data packets to an assigned endpoint 202. The selection algorithm can then process the generated scores for a given communication request (e.g., a connection to a service) by selecting an endpoint with a "highest" score. The selection algorithm can correspond to a weighted rendezvous hashing algorithm in one embodiment. In another embodiment, the selection algorithm can be a weighted consistent hashing algorithm in another embodiment.

After selecting an endpoint 202 to which to route a packet, a flow manager 304 can modify the packet to facilitate routing to the endpoint 202. For example, a destination network address of the packet, when received at the router 302, may be a global network address. The flow manager 304 may therefore modify the packet to replace the destination network address with a network address of the endpoint 202. In one embodiment, each flow manager 304 implements NAT techniques to modify packets addressed to global network addresses. For example, each flow manager 304 may, for packets bound for endpoints 202, replace a global network address with a network address of an endpoint 202 as the destination network address of the packet, and replace a network address of the client device 102 with an address of access point 106 as a source address. Similar translation may occur for packets from endpoints 202 to be routed to client devices 102, in accordance with NAT techniques. Flow managers 304 may illustratively use port translation (a known NAT technique) to distinguish between translated flows. After translation, the flow manager 304 can return the packet to the router 302 for transmission to the selected endpoint 202 over the network 108.

In another embodiment, a flow manager 304 may utilize encapsulation to route a packet to an endpoint 202. Illustratively, each flow manager 304 may generate an IP "tunnel" to a device within a data center 110, such as the session handoff manager 212 or a router within the data center 110. To route packets to an endpoint 202, a flow manager 304 may encapsulate the packet, and transmit the packet to the receiving device via the tunnel. The receiving device may then decapsulate the packet and transmit the packet to the endpoint 202. In one embodiment, the flow manager 304 replaces a destination address of the packet (e.g., a global network address of the service) with a destination address of the selected endpoint 202 to facilitate transmission of the packet 202 to the endpoint. Encapsulation of packets over a tunnel may provide benefits, such as preservation of the network address of a client device 102 that transmitted the packet.

While only some components of the access points 106 are shown as in communication with the networks 104 and 108, other components may additionally be in communication with the network 108 and/or the network 104. The lines of FIG. 3 are not intended to represent all actual or potential network connections, but rather to illustrate a possible flow of service-related traffic through an access point 106.

The data center 110 of FIG. 2 and the global access point 106 of FIG. 3 are operating in a distributed computing environment including one or more computer systems that are interconnected using one or more computer networks (not in the respective figures). The data center 110 of FIG. 2 and the global access point 106 of FIG. 3 could also operate within a computing environment having a fewer or greater number of devices than are illustrated in the respective figures. Thus, the depictions of the data center 110 of FIG. 2 and the global access point 106 of FIG. 3 should be taken as illustrative and not limiting to the present disclosure. For example, data center 110 of FIG. 2, the global access point 106 of FIG. 3, or various constituents thereof, could implement various Web services components, hosted or "cloud" computing environments, and/or peer to peer network configurations to implement at least a portion of the processes described herein.

Figure 4:
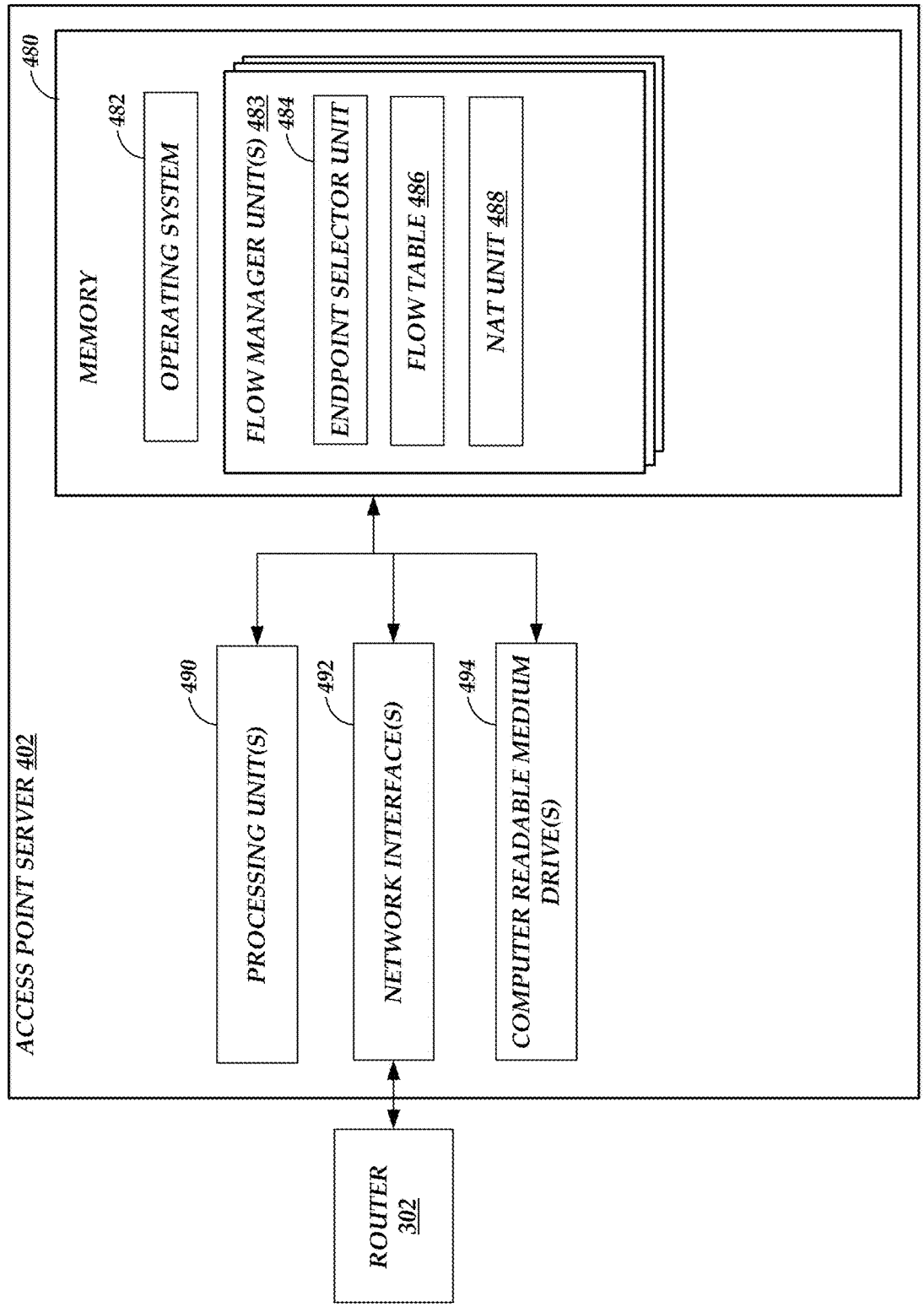
FIG. 4 is a block diagram depicting an illustrative configuration of a flow manager server implementing one or more flow managers within a global access point of FIG. 1.

FIG. 4 depicts a general architecture of an example computing system (referenced as an access point server 402) that operates to implement flow managers 304 of an access point 106. The general architecture of the access point server 402 depicted in FIG. 4 includes an arrangement of computer hardware and software modules that may be used to implement aspects of the present disclosure. The hardware modules may be implemented with physical electronic devices, as discussed in greater detail below. The access point server 402 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIGS. 2 and 3. As illustrated, the access point server 402 includes one or more processing units 490, one or more network interface 492, and one or more computer readable medium drives 494, all of which may communicate with one another by way of a communication bus. The network interfaces 492 may provide connectivity to one or more networks or computing systems, such as the router 302 (which may correspond, for example, to a commercially available router device). The processing units 490 may thus receive information and instructions from other computing systems or services via networks, such as network 104 or 108. The processing unit 490 may also communicate to and from memory 480.

The memory 480 may contain computer program instructions (grouped as modules in some embodiments) that the processing unit 490 executes in order to implement one or more aspects of the present disclosure. The memory 480 generally includes random access memory (RAM), read only memory (ROM) and/or other persistent, auxiliary or non-transitory computer readable media. The memory 480 may store an operating system 482 that provides computer program instructions for use by the processing unit 490 in the general administration and operation of the access point server 402. The memory 480 may further include computer program instructions and other information for implementing aspects of the present disclosure. For example, in one embodiment, the memory 480 includes one or more flow manager units 483, each of which represents code executing to implement a flow manager 304 of FIG. 3. Each flow manager unit 483 may illustratively be isolated from other units 483 on the server 402. For example, each unit may represent a separate virtual machine or isolated software container. In some instances, each unit 483 may be associated with separate processing units 490, interfaces 492, or drives 494, minimizing potential for operation of one unit 483 to impact operation of another unit 483. Each unit 483 illustratively includes an endpoint selector unit 484, representing code executable to select an endpoint 202 to which to route a packet addressed to a global network address, a flow table 486 representing a table of information mapping flows of packets to endpoints 202, and a NAT unit 488 representing code executable to perform NAT on packets addressed to global network addresses, or responses to such packets from endpoints 202. While not shown in FIG. 4, the memory 480 also illustratively includes an encapsulation unit representing code executable to generate a tunnel connection to another device enabling transmission of encapsulated packets, and to conduct encapsulation/decapsulation to facilitate such transmission.

While FIG. 4 depicts a single server 402 and router 302, in some instances a global access point 106 may be implemented by multiple servers 402 and/or routers 302. In some instances, such servers 402 or routers 302 may be physically or logically isolated, to avoid propagation of errors between such servers 402 or routers 302. Illustratively, where an access point 106 handles multiple pools of network addresses, each pool may be handled by a distinct server 402 and router 302. Thus, should one router 302 and/or server 402 fail, only services associated with the pool handled by that router 302 and/or server 402 would be expected to be affected.

In some embodiments, the endpoint selector unit 484 may apply one or more selection or similar algorithms. For example, as described in further detail below, the endpoint selector unit 484 may enable the access point 106 to determine to which endpoint 202 the access point 106 will convey requests and/or packets received from the client. In some instances, the access point server 402 may control routing for multiple access points 106 and apply the algorithm to ensure that no two access points 106 route traffic from the same client device 102 to the same endpoint 202. Thus, no endpoint 202 will receive two requests or packets that it could erroneously identify as being duplicates of each other. In some embodiments, when each access point 106 comprises its own access point server 402, the endpoint selector unit 484 may communicate with endpoint selector units 484 from other access points 106 and access point servers 402 to obtain information (such as endpoint ranking lists and/or scores, as described further below) and work together to ensure that no endpoint 202 receives two requests or packets that it could interpret as being duplicates. Additionally, in some instances, the endpoint selector unit 484 may be initialized and/or programmed to know or otherwise know or receive information (for example, IP address and port information) for other access points 106 to determine endpoint scores and/or endpoint ranking lists for endpoints 202 when applying the algorithms to determine which endpoint 202 another access point 106 will route packets or requests to and identify a different endpoint 202 to which the access point 106 will send its packets or requests. Further details of the operation of the access points 106, the access point server 402, and/or the endpoint selector unit 484 are provided below with respect to FIGS. 5-7.

Figure 5:
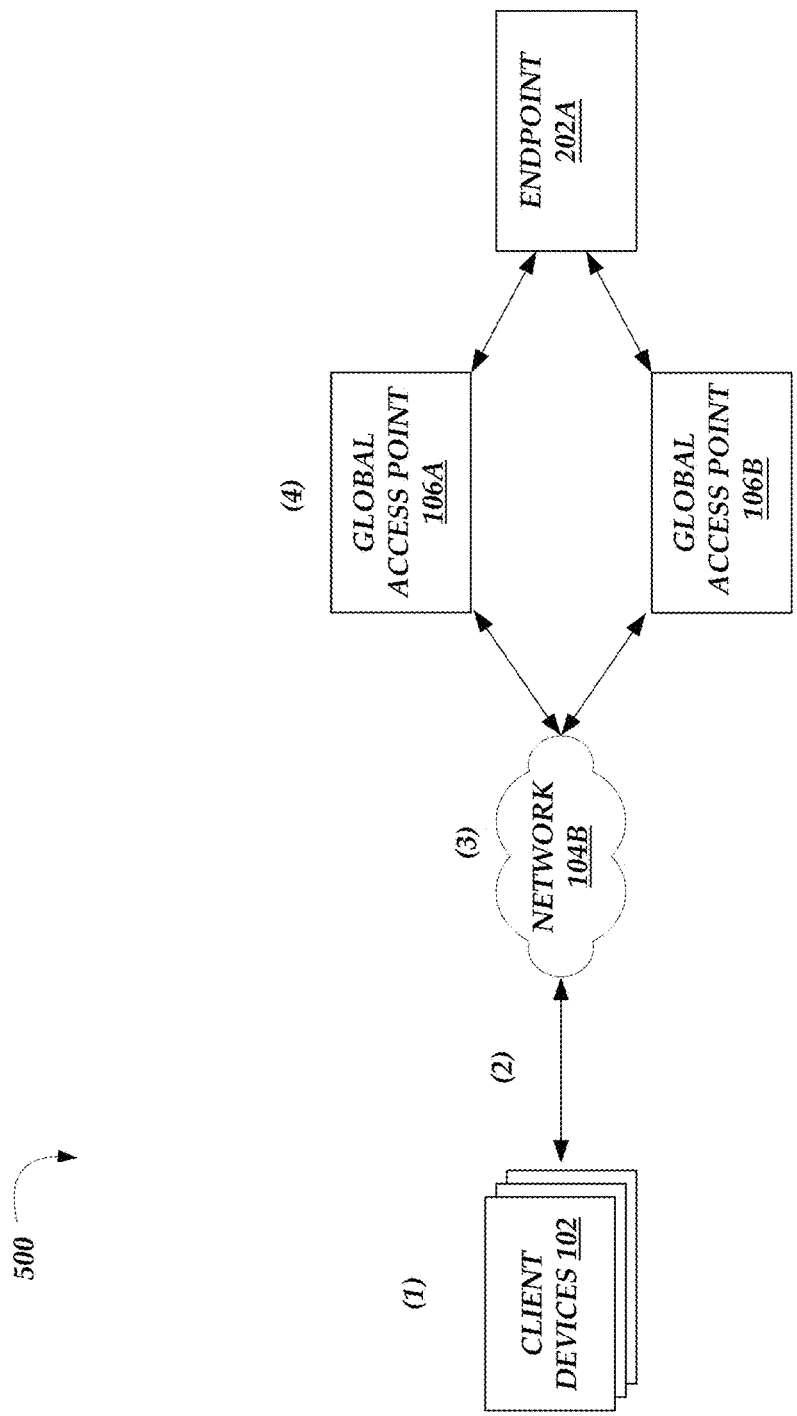
FIG. 5 depicts illustrative interactions for routing a request from a client device addressed to a global network address via a global access point of FIG. 1.

With reference to FIG. 5, illustrative interactions will be described that depict how a request from an individual client can be routed to a global network address via a global access point of FIG. 1. FIG. 5 depicts an environment 500, which may in turn represent an embodiment of a portion of the environment 100 of FIG. 1. Specifically, in the environment 500, the networks 104 and 108 are used for communications between the client devices 102 and data centers 110 (or endpoints 202). The environment 500 depicts a client device 102 that communications with a network, for example, the network 104, via a NAT gateway 502. The network 104 may enable communications between NAT gateway 502 and the global access points 106*a* and/or 106*b*. The network 108 may enable communications between the global access points 106*a* and 106*b* and the endpoint 202*a*. In some embodiments, one or both of the networks 104 and 108 (or a different network, not shown) may enable communications between the global access points 106*a* and 106*b*. In some embodiments, the endpoint 202*a* may communicate back to the requesting client device 102 in response to the request received from the client device 102. This response may be communicated back to the client device via the global access point(s) 106*a* and/or 106*b* and the NAT gateway 502.

In some embodiments, the client device 102 may wish to access a service provided by the endpoint 202*a*. The client device 102 may generate requests to the endpoint 202*a*. In some embodiments, the endpoint 202*a* may communicate back to the requesting client device 102 in response to the request received from the client device 102. This response may be communicated back to the client device via the global access point(s) 106*a* and/or 106*b* and the NAT gateway 502.

The client device 102 may generate one or more requests identifying a network address at which the client device 102 expects the service will be available. Specifically, as shown in FIG. 5, at (1), the client device 102 generates a service request to be communicated to the service endpoint 202*a*. In some embodiments, the client device 102 may generate two (or more) service requests between the client device 102 and the requested service endpoint 202. In some embodiments, the two (or more) requests may enable redundancy of communications between the client device 102 and the service. For example, the redundant communications may utilize different paths between the client device 102 and the service, which may provide a failsafe and/or load balanced communications. The first request may travel (and establish communications) between the client device 102 and the endpoint 202*a* via the first global access point 106*a* while the second request may travel (and establish communications) between the client device 102 and the endpoint 202*a* via the second global access point 106*b*. The client device 102 may generate each request as one or more packets with a 5 tuple of information, including a source IP address, a source port, a destination IP address, a destination port, and a communication protocol, where the "source" is the client device 102 and the destination is the specific global access point 106*a* or 106*b* that the client device 102 uses to reach the service provided by the endpoint 202*a*. In some instances, the requests generated by the client device 102 may comprise different or unique 5-tuples; for example, a first request may comprise a source IP address, a first source port, a first destination IP address, and a destination port, while a second request may comprise the source IP address, a second source port, a second destination IP address, and the destination port. For example, when the first request is associated with establishing a first path between the client device 102 and the service, the 5-tuple may include the source IP address, the first source port, the first destination IP address, and the destination port while the second request, associated with a second path between the client device 102 and the service may have the 5-tuple including the source IP address, the second source port, the second destination IP address, and the destination port. The communication protocol of the 5-tuples may be the same for the requests.

At (2), the client device 102 may communicate the first and second requests to the NAT gateway 502 for communication to the service. When the NAT gateway 502 is used to enable communication over the network 104, the NAT gateway 502, at (3), may operate to make the source IP address and the source port the same for both requests. Accordingly, while the NAT gateway may direct the two requests to different global access points 106*a* and 106*b* as described above, these two request may be viewed as coming from a single device, with both requests having the same source IP address and port. Thus, networked devices (for example, communicating via the network 104 enabling communications between the client device 102 and/or NAT gateway 502 and the global access points 106, may identify the first and second requests as being generated and transmitted by a "single" client device 102 and/or as being copies of the same request.

At (4), the global access points 106*a* and 106*b* may forward the first and second requests on to the endpoint 202, as described herein. In some instances, this may involve updating the first and second requests, respectively, with destination IP address and/or port for the endpoint 202*a*. In some instances, the forwarding of the first and second requests on to the single endpoint 202 creates issues for the logical environment 100 and/or the environment 500. For example, when the endpoint 202 assumes that the first and second requests are copies or duplicate requests as opposed to being unique requests to establish distinct communication paths (because the first and second requests have the same source IP address and port after being transmitted by the NAT gateway 502), networked devices, including the endpoint 202, may ignore or otherwise not respond to the second request in an expected manner. For example, while the endpoint 202 may respond to the first request by establishing a connection with the client device 102 via the NAT gateway 502 and the global access point 106*a*, the endpoint 202 may ignore or not respond to the second request. This is because when the endpoint 202 has already responded to the first request, the endpoint 202, seeing the same source IP address and port in the second request as was previously received in the first request, assumes that the first and second requests both come the same source and are merely duplicates of the same request. However, since the second request is not a "duplicate" request but rather a distinct request, this lack of response by the endpoint 202 may cause communication problems in the environment 500.

In the illustration of FIG. 5, client devices 102 generally have two routes through which to reach the endpoint 202. However, these two routes through different global access points 106 can comprise any number of two or more global access points 106, where individual requests may be routed through the number of two or more global access points 106 to the endpoint 202. In some instances, the multiple paths between the client devices 102 and the endpoint 202 increase the resiliency of access to the endpoint 202.

Figure 6:
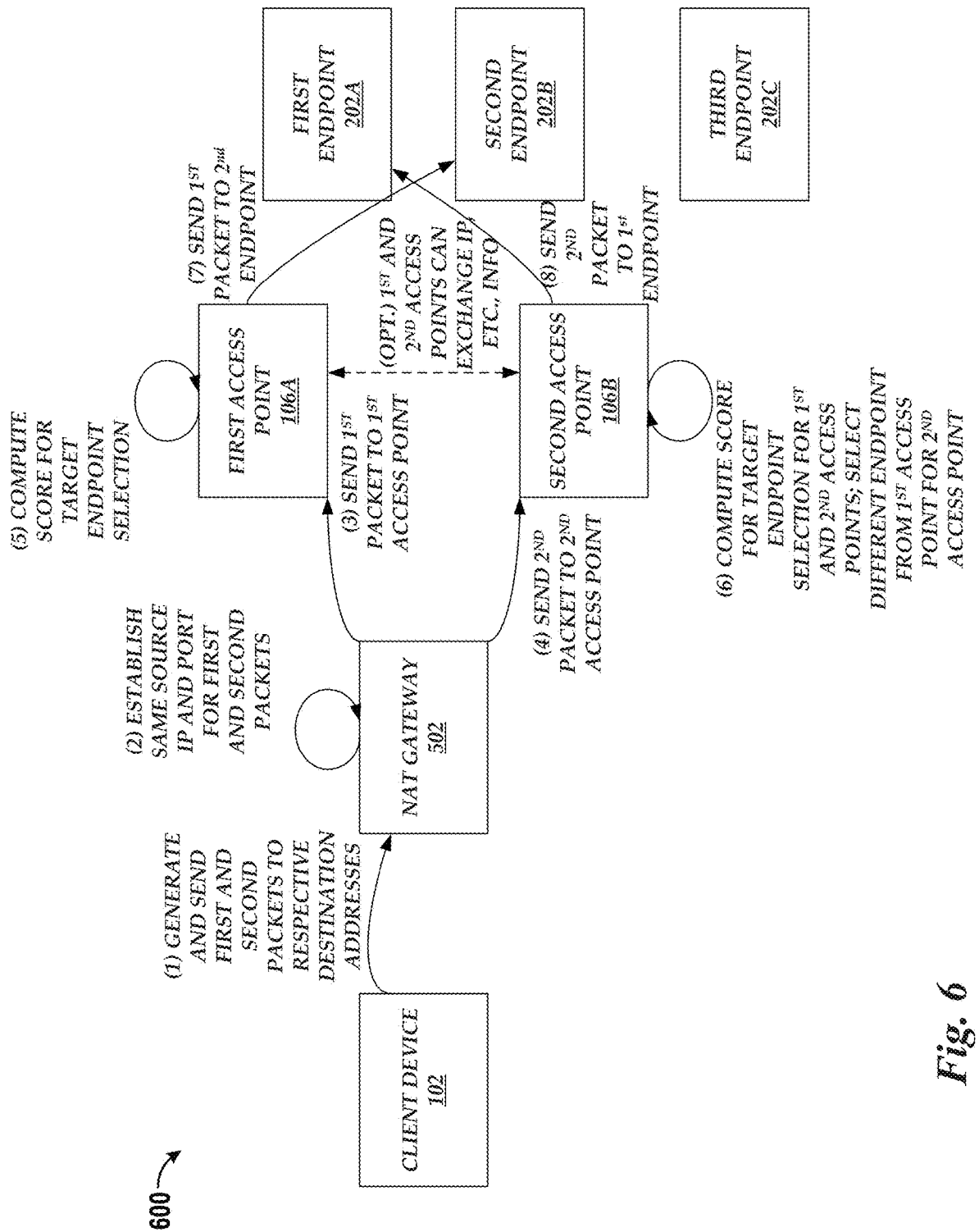
FIG. 6 depicts illustrative interactions for routing requests from the client device of FIG. 5 to endpoints of a service provided by endpoints of FIG. 2, such that the individual requests are not interpreted as duplicates.

With reference to FIG. 6, illustrative interactions will be described for operation of communications between a client device 102 and first endpoint 202*a* and second endpoint 202*b* via the NAT gateway 502 and the first access point 106*a* and second access point 106*b*. As described herein, the first and second endpoints 202*a* and 202*b*, respectively, may provide access to the service for the client device 102. The interactions of FIG. 6 begin at (1), where the client device 102 transmits data packets (i.e., requests) to the global access points 106*a* and 106*b*, which forwards the requests to the endpoints 202*a* and 202*b*. The data packet may, for example, be formatted in accordance with the Transmission Control Protocol (TCP), the user datagram protocol (UDP), or the Internet Control Message Protocol (ICMP). The data packet may be transmitted and routed via operations of the network 104 between the client device 102 and the NAT gateway 502 and the first and second access points 106*a* and 106*b*, for example, based on advertisements of the global access points 106*a* and 106*b* indicating that the global network address to which the packet is addressed is available via the global access points 106*a* and 106*b*. For example, the global access points 106*a* and 106*b* may be the nearest (e.g., in network distance terms) global access points 106 to the client device 102.

At (1), similar to (1) in FIG. 5, the client device 102 generates the service requests for the service provided by the endpoints 202*a* and 202*b*. In some embodiments, the client device 102 may generate two (or more) service requests that are transmitted between the client device 102 and the requested service endpoint 202. In some embodiments, the generated requests may enable redundancy of communications between the client device 102 and the endpoints 202*a* and 202*b*. For example, the redundant communications may utilize different paths between the client device 102 and the service, which may provide for failsafe and/or load balanced communications. Accordingly, the first request may travel (and establish communications) between the client device 102 and the endpoint 202*a* via the first global access point 106*a* while the second request may do the same between the client device 102 and the endpoint 202*a* via the second global access point 106*b*. The client device 102 may generate each request as one or more packets with a 5-tuple of information, including a source IP address, a source port, a destination IP address, a destination port, and a communication protocol, where the "source" is the client device 102 and the destination is the specific global access point 106*a* or 106*b* that the client device 102 uses to reach the service provided by the endpoint 202*a*. In some instances, the requests generated by the client device 102 may comprise different or unique 5-tuples; for example, the first request may comprise the source IP address, the first source port, the first destination IP address, and the destination port, while the second request may comprise the source IP address, the second source port, the second destination IP address, and the destination port. For example, when the first request is associated with establishing the first path between the client device 102 and the service via the first access point 106*a*, the 5-tuple for the first request includes the IP address and port of the client device 102 and the first destination IP address and port (for example, of the first access point 106*a*), and the destination port while the second request, associated with the second path between the client device 102 and the service endpoint 202 may have the 5-tuple including the IP address and port of the client device 102 and the second destination IP address and port (for example, of the second access point 106b). The communication protocol of the 5-tuples may be the same for the requests.

On receiving the requests (and corresponding data packets), the NAT gateway 502 may make the source IP address and the source port the same for both requests, at (2). In some instances, the different requests generated by the client device 102 may have different IP address and/or port. The NAT gateway 502 may repackage the requests and change these different IP address and/or port values to the same IP address and port value. Accordingly, at (2), the NAT gateway may direct the two requests to different global access points 106a and 106b as described above with 5-tuples having only different destination IP address and port values. Thus, networked devices (for example, communicating via the network 104 enabling communications between the NAT gateway 502 and the global access points 106), may identify the first and second requests as being generated and transmitted by a "single" client device 102 and potentially misidentify or misinterpret the first and second requests as being copies or duplicates of the same request.

At (3) and (4), the NAT gateway 502 transmits the first packet to the first access point 106a and the second packet to the second access point 106b, respectively. As indicated above, these communications (i.e., communications between the NAT gateway 502 and the first and second access points 106a and 106b) may occur via the network 104.

At (5), the first access point 106a may generate rankings for the first endpoint 202a and the second endpoint 202b. In some instances, the ranking may be generated by the endpoint selection unit 484 for one or both of the access points 106a and 106b or an access point server 402 that is separate from one or more access points 106. For example, the first access point 106a (via, for example, the endpoint selection unit 484) may apply the selection algorithm described herein to generate a score for each of the first endpoint 202a and the second endpoint 202b. The first access point 106a may generate a list of endpoints 202 that ranks the endpoints according to the generated scores. For example, the first access point 106a may generate, for the first, second, and third access points 106a-106c, respectively, the ranked endpoint list of 2, 3, 1. This may mean that the second endpoint 202b has the highest score, the third endpoint 202c has the second highest score, and the first endpoint 202a having the lowest score, where the scores are generated based on the selection algorithm, destination IP and port values, and request 5-tuple information. The first access point 106 may use the scores and ranking list of endpoints 202 to select and/or determine to which endpoint 202 the first access point 106 will send forward the first request.

As described above, the first and second requests, when having the same source IP address and port values, may be interpreted as being duplicates or copies of the same request. If the same endpoint 202 receives both of the first and second requests, even if the requests come from different access points 106a and 106b, the endpoint 202 may ignore the second request as being duplicate of the first request. Thus, to avoid situations where the endpoint 202 receives both the first and second requests, and thereto to avoid resulting issues, the first and second access points 106 may utilize the selection algorithm to ensure that the first and second requests are distributed to different endpoints 202 for the desired service. By distributing the requests to different endpoints 202, the requests will be properly responded to and, thus, enable creation of the appropriate two connections between the client device 102 and the service provided by the endpoints 202.

The first and second access points 106a and 106b can accomplish this in various ways. For example, the first and second access points 106a and 106b may communicate with each other and indicate to each which endpoints 202a-202c each of the first access point 106a and the second access point 106b is going to select or has selected. Thus, the first access point 106a can tell the second access point 106b that the first access point 106a is going to select the endpoint 202a. Accordingly, the second access point 106b can know to select a different endpoint 202a (for example, the second endpoint 202b or the third endpoint 202c) or the first access point 106a can instruct the second access point 106c to select a particular of the remaining second and third endpoints 202b and 202c. In some instances, a manager for the environment 600 may coordinate which access point 106 sends requests to which endpoints 202.

Alternatively, the first and second access points 106a and 106b, respectively, may utilize the selection algorithm described herein to generate the ranking of endpoints for the access point 106. For example, the first access point 106a may apply the selection algorithm to the 5-tuple for the first request and identify, for each endpoint 202, a score for that endpoint. For example, the first access point 106a may generate a score of "5" for the first endpoint 202a, "7" for the second endpoint 202b, and "3" for the third endpoint 202c based on the information for the first request (which may include the IP address for the corresponding endpoint 202), among other potential information. The first access point 106a may generate the ranking for all the endpoints 202a-202c of the service to be the second endpoint 202b, the first endpoint 202a, and the third endpoint 202c, or (2, 1, 3), where the higher score results in the higher ranked endpoint 202. Similarly, the second access point 106b applies the selection algorithm to the 5-tuple for the second request and identifies, for each endpoint 202a-202c, the score for that endpoint 202. For example, the second access point 106b may generate a score of "3" for the first endpoint 202a, "7" for the second endpoint 202b, and "5" for the third endpoint 202c. Thus, the ranking for all the endpoints 202a-202c for the second access point 106b may be the second endpoint 202b, the third endpoint 202c, and the first endpoint 202a, or (2, 3, 1). Thus, the ranking list of the endpoints 202 for the first access point 106a is different from the ranking list of the endpoints 202 for the second access point 106b. The algorithm applied to generate the ranking lists may be the weighted rendezvous hashing algorithm described herein.

Thus, one of the first and/or second access point 106a and/or 106b, respectively, for example, whichever is designated as the primary access point, may identify the ranking list of the endpoints 202 for both (or all corresponding access points if there are more than two) to ensure that the primary access point 106a does not select the same endpoint as the secondary access point 106b (or any other access point 106 when there are more than two access points 106 and two requests or packets). Thus, only one of the access points 106 needs to perform additional processing to ensure that the communications are appropriately established between the client device 102 and the endpoints 202 for the service, thereby reducing potential constraints in the environment (requiring multiple access points 106 to apply the selection algorithm for other access points 106) while enabling the environment to improve communications and reduce issues resulting from the same endpoint 202 receiving multiple requests from a single entity device 102.

Based on the ranking lists for the endpoints 202 for the first and second access points 106a and 106b, respectively, the first and second access points 106a and 106b may identify which endpoint 202 it will select and select different endpoints 202. For example, one of the first and second access points 106a and 106b, respectively, may use the ranking lists of the two access points 106a and 106b to select a different from the other access point 106. Instructively, at (6), the second access point 106a may be deemed a primary or master access point. Accordingly, the second access point 106a may identify the endpoint-ranking list for both the first access point 106a (for example, (2, 1, 3)) and the second access point 106b (for example, (2, 3, 1)). The second access point 106a may then evaluate the two ranking lists and determine whether the highest ranked endpoint 202 for each access point 106 is the same. In the example provided, the highest ranked endpoint 202 for each of the first access point 106a and the second access point 106b is the endpoint 202b. Thus, the second access point 106a, being set as the primary access point, may increment its selection of endpoints 202 to the second highest endpoint in the ranked endpoint from the endpoint ranking list for the second access point 106a. Thus, the first access point 106b is allowed to select the second endpoint 202b and the second access point 106a selects the first endpoint 202a based on the ranking list (2, 1, 3), where the first endpoint 202a is the second highest ranked endpoint 202 for the second access point 106a ranking list. In some embodiments, the primary access point is the access point that changes its endpoint selection from the highest ranked endpoint to the second highest ranked endpoint. In some embodiments, the secondary access point is the access point 106 that changes its endpoint selection when both the first access point and the second access point 106a and 106b have the same highest ranked endpoint 202. In some instances, the primary and/or secondary access point 106 network information (for example, network address and/or port information) is programmed into the access point 106 when initialized, implemented, or established. In some instances, the primary/secondary access point 106 is established by user selection or default nature of timing between receipt of the corresponding first and second requests, where the access point 106 that receives the first request becomes the primary access point 106. In some embodiments, the first and second access points 106a and 106b communicate with each other and determine which is the primary/secondary access point through a handshake and/or negotiation procedure. Such communications may also involve exchanging IP address and/or other information used as part of the selection algorithm. Such optional communications are shown in FIG. 6.

After the endpoint 202 scores and ranking lists are generated at (5) and (6), the first access point 106a, at (7), may convey the first request to the second endpoint 202b, which had the highest score of "7" according to the selection algorithm described above. Similarly, at (8), the second access point 106b conveys the second request to the first endpoint 202a after identifying that both the first access point 106a and the second access point 106b had highest ranked endpoint as the second endpoint 202b but incrementing its endpoint selection to the first endpoint 202a. In some embodiments, the selection algorithm employed herein comprises a weight rendezvous hashing (WRH) algorithm.

Figure 7:
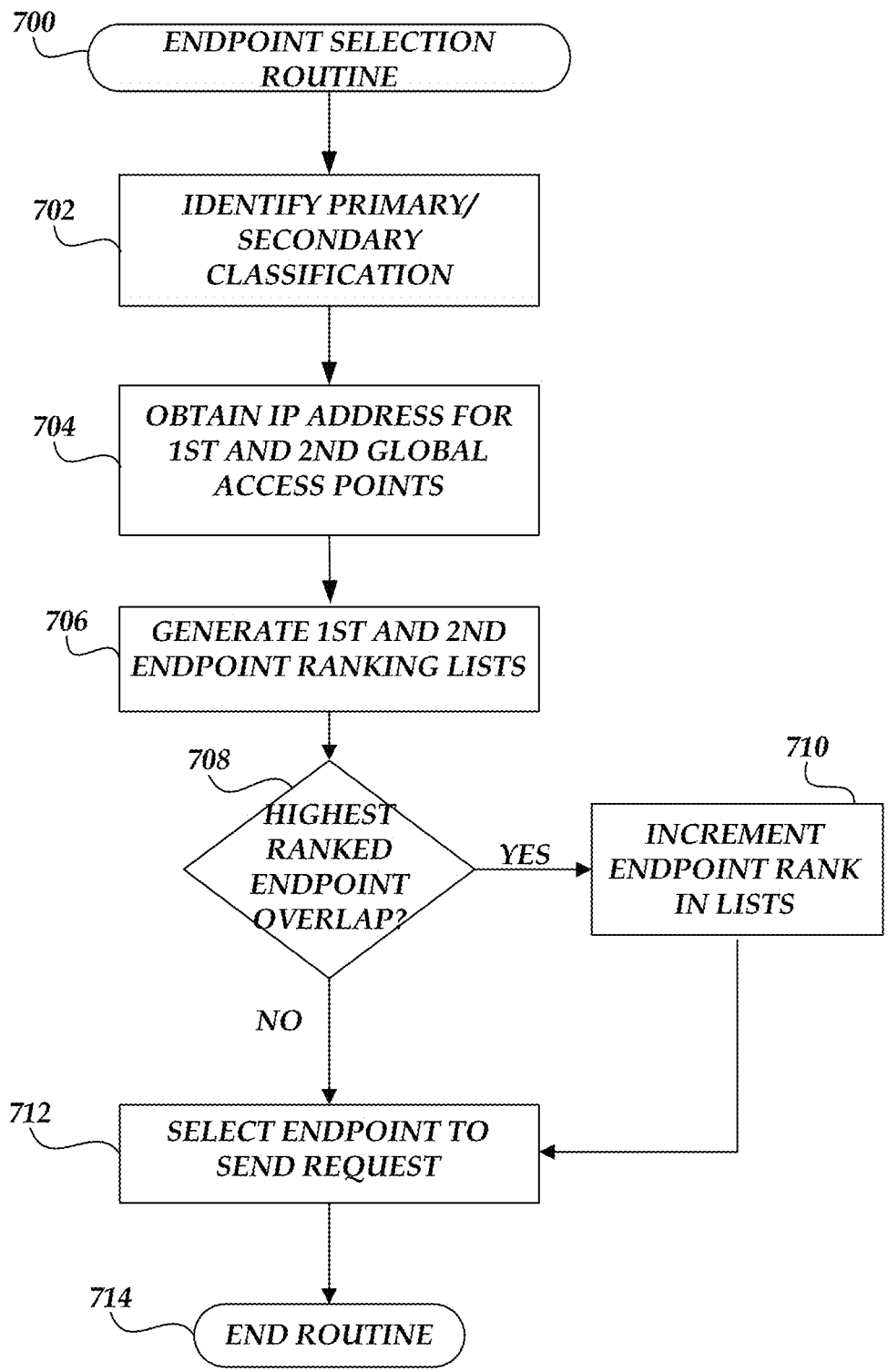
FIG. 7 depicts an illustrative routine for routing traffic addressed to a global network address associated with a service provided by endpoints to different endpoints, by use of the access points of FIG. 1.

With reference to FIG. 7, an illustrative routine 700 will be described for routing packets and requests to selected endpoints associated with a desired service. The routine 700 may illustratively be implemented by a global access point 106 (e.g., during initialization and/or normal operation of the access point 106). In one embodiment, an instance of the routine 700 is implemented by each access point 106.

The routine 700 begins at block 702, where the global access point 106 identifies whether it is the primary or secondary access point. In some embodiments, the global access point 106 identifies its primary or secondary status based on program implemented in the global access point 106 itself. In some instances, the primary or secondary status is selected by a user of the environment or a client device, determined by which global access point 106 receives the first of multiple requests from a single client device 102, or based on negotiations between the first global access point 106a and the second global access point 106b.

At block 704, the global access point 106 receives the IP address for the first and second global access points 106a and 106b, respectively. As indicated above, the IP addresses for the first and second global access points 106a and 106b, respectively (and other network information for the first and second global access points 106a and 106b, respectively) can be received via communications between the global access points 106, from an initialization or programming of the global access points 106, from a server or controller, and the like, and, thus, be static information for the global access points 106 with respect to connections generated between client device 102 and the service endpoints 202.

At block 706, the global access point 106 generates a first and/or a second endpoint-ranking list. For example, when the global access point 106 is the first or second global access point providing access for a client device 102 to a service (for example, service endpoints 202), the first global access point 106a may generate a first endpoint ranking list for the first global access point 106a while the second global access point 106b may generate the first endpoint ranking for the first global access point 106a and a second endpoint ranking list for the second global access point 106b. As described herein, generating the endpoint ranking list may comprise applying the selection (or a similar) algorithm based on information for the received request and endpoint 202 or global access point 106 information. In some instances, the generated list is used to select which global access point 106 routes traffic (i.e., requests) to which endpoint 202 of the service. In some instances, a single global access point 106 generates the endpoint ranking lists and shares the corresponding list(s) with the appropriate global access point 106. As noted herein, the selection algorithm may utilize static information from when the global access points 106 were initialized in conjunction with dynamic information received from active communications, for example, the source network address and/or port information for the received request(s). Thus, as the global access points 106 receive requests for new connections, the primary global access point 106 may dynamically generate the first and/or second endpoint-ranking lists based on the dynamic 5-tuple information in the received request and the static network address information for the first and second global access points 106a and 106b, respectively. Specifically, the first and/or second endpoint-ranking lists may be based on the 5-tuple information that includes the static global access point IP address and port information and routing protocol and the dynamic client device IP address and port information. In instances where an existing connection exists for a received request, the global access points 106 may reuse the existing connection and may not recalculate the ranking lists suing the selection algorithm.

Thus, in some embodiments, though not shown with respect to FIG. 7, the routine 700 may further comprise the global access point 106 determining whether the received request involves creating a new connection between the single client device 102 and the desired service provided by the service endpoints 202. When the received request does involve creating the new connection (for example, the received request is from a client device 102 that has not previously established a connection with the service endpoints 202), the global access point 106 may utilize the routine 700, for example as described with respect to blocks 704-712, to create the new connection as appropriate. When the received request is from a client device 102 that has previously established a connection with the service endpoints 202, the previously utilized connection may be reused without the global access point 106 having to regenerate endpoint ranking lists and performing any comparisons of overlapping endpoints 202.

At block 708, the global access point 106 compares the highest ranked endpoints for each of the ranked lists. If each of the lists includes the same highest ranked endpoint 202 (for example, the (2, 1, 3) and (2, 3, 1) ranking lists above), then the global access point 106 performing the comparison may increment the endpoint selection to the second highest endpoint. By enabling only one of global access points 106 to change its selection of the endpoint from the default highest scoring or ranked endpoint, the global access point 106 reduces and/or eliminates a likelihood that the first and second requests will be communicated to the same endpoint 202 and reduce a risk of issues developing from both of the requests being communicated to the same endpoint 202.

If the global access point 106 determines that the highest ranked endpoints 202 for both of the global access points 106 are the same or overlap, then the routine 700 proceeds to block 710, where one of the global access points 106 (for example, the primary or secondary global access point 106) increments its endpoint selection to the second highest endpoint 202. Once the appropriate global access point 106 increments its endpoint 202, the routine proceeds to block 712. At block 708, if the highest ranked endpoints for the two global access points 106a and 106b do not overlap or are not the same, the routine proceeds to block 712, where the appropriate endpoint 202 is selected for communication of the appropriate request from the client device 102. At block 714, the routine 700 ends.

All of the methods and processes described above may be embodied in, and fully automated via, software code modules executed by one or more general-purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a plurality of endpoints, each endpoint of the plurality of endpoints containing at least one server computing device configured to provide a network-accessible service associated with a network address;
   a first global access point including a processor, the first global access point associated with the network-accessible service, the plurality of endpoints, and a first access point network address;
   a second global access point including a processor, the second global access point associated with the network-accessible service, the plurality of endpoints, and a second access point network address, the processor of the second global access point configured to at least:
   identify the first access point network address for the first global access point and the second access point network address for the second global access point;
   receive, from a client device, a network packet addressed to the second access point network address of the second global access point;
   calculate, for the first global access point, a first ranked list of the plurality of endpoints based at least partly on a selection algorithm, the first access point network address for the first global access point, and information associated with the network packet;
   calculate, for the second global access point, a second ranked list of the plurality of endpoints based at least partly on the selection algorithm, the second access point network address for the second global access point, and the information associated with the network packet;
   determine that the first ranked list and the second ranked list identify a same first endpoint of the plurality of endpoints as a highest ranked endpoint for both the first global access point and the second global access point, wherein the first ranked list further identifies a second endpoint of the plurality of endpoints as a second highest ranked endpoint for the first global access point;

select the second endpoint from the first ranked list for the first global access point based at least partly on determining that the first ranked list and the second ranked list identify the same first endpoint as the highest ranked endpoint for both the first global access point and the second global access point so that the first global access point routes network traffic from the client device to the second endpoint and the second global access point routes network traffic from the client device to the same first endpoint; and route the network packet to the same first endpoint.

2. The system of claim 1, wherein the information associated with the network packet comprises one or more of an IP address of the client device, a port address of the client device, an access point network address of a corresponding global access point, a port address of the corresponding global access point, and a routing protocol.

3. The system of claim 1, wherein the processor of the second global access point is configured to calculate the first ranked list and the second ranked list based at least partly on the information associated with the network packet.

4. The system of claim 1, wherein the selection algorithm corresponds to a weighted rendezvous hashing algorithm.

5. The system of claim 1, wherein to identify the access point network address for the first global access point, the processor of the second global access point is further configured to receive the access point network address for the first global access point from the first global access point via a communication with the first global access point.

6. The system of claim 1, wherein to identify the access point network address for the first global access point, the processor of the second global access point is further configured to access data stored in a memory during initialization or programming of the second global access point.

7. A method implemented at a plurality of network routing points to a network-accessible service, the method comprising:

receiving, at a network routing point of the plurality of network routing points, a network packet from a client device, the network packet addressed to a network address of the network-accessible service;

identifying, by the network routing point and based at least partly on an implementation of a selection algorithm, (1) a first ranked list of a plurality of endpoints for the network routing point based at least partly on information associated with the network packet and first routing point network information associated with the network routing point and (2) a second ranked list of the plurality of endpoints for another network routing point of the plurality of network routing points based at least partly on the information associated with the network packet and second routing point network information associated with the another network routing point;

determining, by the network routing point that the first ranked list and the second ranked list identify a same first endpoint of the plurality of endpoints as a highest ranked endpoint for both the network routing point and the another network routing point, wherein the first ranked list further identifies a second endpoint of the plurality of endpoints as a second highest ranked endpoint for the network routing point;

selecting, by the network routing point, the second endpoint from the first ranked list for the network routing point to route the network packet based at least partly on determining that the first ranked list and the second ranked list identify the same first endpoint as the highest ranked endpoint for both the network routing point and the another network routing point, so that the network routing point routes network traffic from the client device addressed to the network address to the second endpoint and the another network routing point routes network traffic from the client device addressed to the network address to the same first endpoint; and routing the network packet to the second endpoint.

8. The method of claim 7, further comprising advertising the network address as reachable via each of the plurality of network routing points.

9. The method of claim 7, wherein the information associated with the network packet comprises one or more of an IP address of the client device, a port address of the client device, a routing point network address of a corresponding network routing point, a port address of the corresponding network routing point, and a routing protocol.

10. The method of claim 9, wherein the IP address of the client device and the port address of the corresponding network routing point comprise dynamic information that can be different for different network packets and corresponds to the network packet.

11. The method of claim 10, wherein the routing point network address of the corresponding network routing point, the port address of the corresponding network routing point, and the routing protocol comprise static information and correspond to one or more network packets received by the network routing point and the another network routing point.

12. The method of claim 7, wherein selecting the second endpoint is based at least partly on (1) at least partly on determining that the first ranked list and the second ranked list identify the same first endpoint as the highest ranked endpoint for both the network routing point and the another network routing point, and (2) the implementation of the selection algorithm, and wherein the implementation of the selection algorithm is based at least partly on the information associated with the network packet.

13. The method of claim 7, further comprising determining that the network packet corresponds to at least one of a new connection between the client device and one of the plurality of endpoints or an existing connection between the client device and one of the plurality of endpoints.

14. The method of claim 7, wherein the selection algorithm corresponds to a weighted rendezvous hashing algorithm.

15. Non-transitory computer-readable media comprising computer-executable instructions that, when executed by a first access point of a pair of access points to a network-accessible service provided by a plurality of endpoints, configure the first access point to at least:

identify that the first access point is a primary access point;

obtain a first IP address for the first access point and a second IP address for a second access point of the pair of access points;

receive, from a client device a network packet addressed to a network address of the network-accessible service;

generate, by the first access point, a first endpoint ranking list of the plurality of endpoints for the first access point and a second endpoint ranking list of the plurality of endpoints for the second access point based at least partly on identifying that the first access point is the primary access point;

determine that the first endpoint ranking list and the second endpoint ranking list identify a same first endpoint of the plurality of endpoints as a highest ranked endpoint for both the first access point and the second access point, wherein the first endpoint ranking list further identifies a second endpoint of the plurality of endpoints as a second highest ranked endpoint for the first access point;

select the second endpoint from the first endpoint ranking list for the first access point based at least partly on (1) identifying that the first access point is the primary access point, and determining that the first endpoint ranking list and the second endpoint ranking list identify the same first endpoint as the highest ranked endpoint for both the first access point and the second access point, so that the first access point routes network traffic from the client device addressed to the network address to the second endpoint and the second access point routes network traffic from the client device addressed to the network address to the same first endpoint; and route the network packet to the second endpoint.

16. The non-transitory computer-readable media of claim 15, comprising further computer-executable instructions that, when executed by the first access point, configure the first access point to at least obtain the second IP address for the ether second access point from the second access point via a communication with the second access point.

17. The non-transitory computer-readable media of claim 15, wherein identification that the first access point is the primary access point and identification of the first IP address for the first access point and the second IP address for the second access point are programmed into the first access point.

18. The non-transitory computer-readable media of claim 15, wherein the first endpoint ranking list and the second endpoint ranking list comprise a ranking of endpoints of the plurality of endpoints for the first access point and the second access point, respectively, and wherein the first endpoint ranking list and the second endpoint ranking list identify an order in which corresponding access points select the endpoints of the plurality of endpoints for transmission of the network packet.

19. The non-transitory computer-readable media of claim 15, comprising further computer-executable instructions that, when executed by the first access point, configure the first access point to at least generate the first endpoint ranking list and the second endpoint ranking list, respectively, based at least partly on a selection algorithm, information associated with the network packet, and network address information associated with the pair of access points.

20. The non-transitory computer-readable media of claim 19, wherein the information associated with the network packet comprises one or more of a source IP address of the network packet, a source port address of the network packet, a destination IP address of the network packet, a destination port address of the network packet, and a protocol of the network packet.

21. The non-transitory computer-readable media of claim 19, wherein the selection algorithm corresponds to a weighted rendezvous hashing algorithm.

* * * * *